May 27, 1958 U. NEUBERT 2,836,785
ELECTROSTATIC MACHINE
Filed Feb. 2, 1956 2 Sheets-Sheet 1

Inventor:
ULRICH NEUBERT
By Toulmin & Toulmin
Attorneys

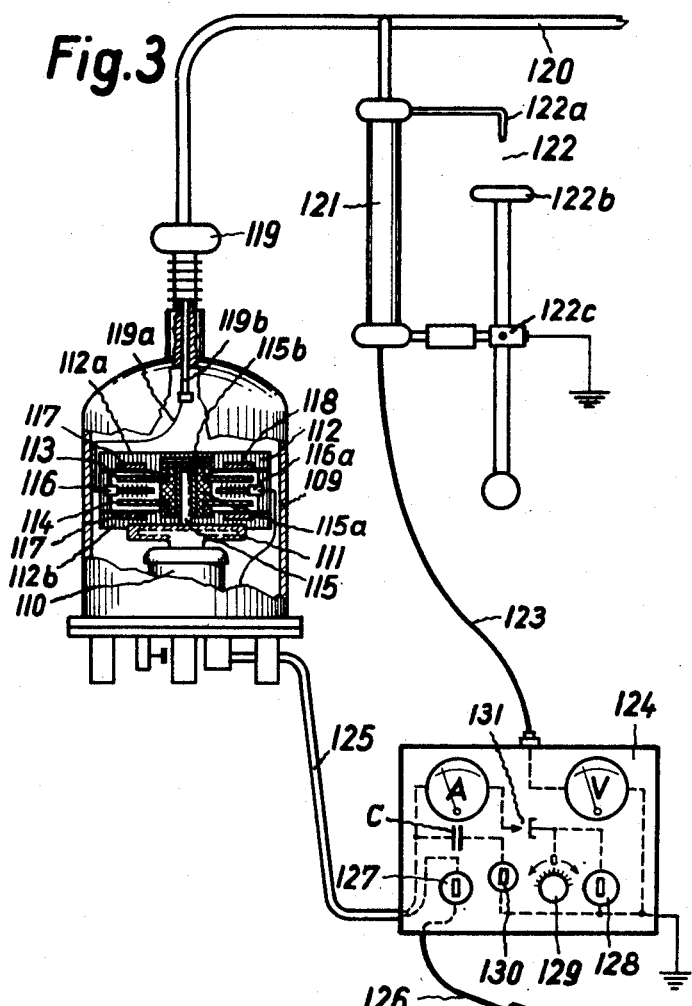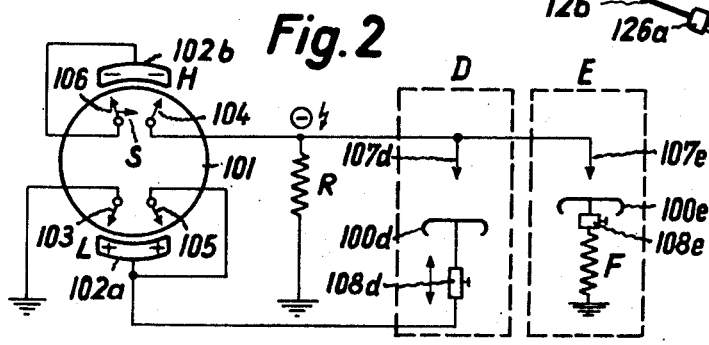
Inventor:
ULRICH NEUBERT

United States Patent Office 2,836,785
Patented May 27, 1958

2,836,785

ELECTROSTATIC MACHINE

Ulrich Neubert, Kassel, Germany, assignor to Licentia Patent-Verwaltungs-G. m. b. H., Hamburg, Germany Application February 2, 1956, Serial No. 563,129

Claims priority, application Germany June 24, 1955

17 Claims. (Cl. 322—2)

This invention relates to devices for producing an electrostatic potential difference by transporting electric charges mechanically against the gradient of an electrostatic field. It relates more particularly to an improved electrostatic machine of the Holtz type.

It is an object of this invention to provide an improved type of electrostatic machine of the Holtz type for generating high voltages which is suitable for technical purposes by eliminating the requirement of a permanent external voltage source.

It is a further object of my invention to provide an electrostatic high voltage generating machine, preferably referred to hereinafter as "static" machine of the Holtz type wherein discharges across the induction plates of insulating material are prevented, and the charge impressed on the "influence" member is equalized and stabilized by a suitable arrangement of charge-spraying and charge-removing electrodes.

It is yet another object to provide an improved static machine of the Holtz type which has a generator for constant current wherein there is provided an improved system for reducing the voltage fluctuations accompanying changes in the load.

The well known rotating disc types of static machines comprise, for instance, the Toepler and the Holtz type machines, of which the element, or elements, whose function it is to carry electric charges takes the form of a rotating disc of dielectric, bearing either metal surfaces as in the Toepler machine, or dielectric surfaces, i. e. surfaces of insulating material as in the Holtz type. Both types of machines have undergone considerable development and have also been combined to form the Toepler-Holtz type.

It is also known in the art to charge the low voltage side of an electrostatic machine from an external voltage source with the aid of a "point-plate" corona system, while a charge transfer on the dielectric carrier surface is carried out on the high voltage side in a conventional manner as proposed by O'Dahl (Rev. Scient. Instr. F, 254 (1936)) for rotating disc machines, and by Van de Graaff for the more modern travelling belt type machines. An example of the latter type of machine is described in the United States Patent 1,991,236 to Van de Graaff, dated February 12, 1935.

A further drawback of the hitherto known electrostatic machines when used as generators of constant current resided in the fact that the resulting voltage was subject to considerable fluctuations, depending upon the load. In order to reduce these fluctuations and avoid extreme voltage values, it has already been proposed to use additional loads which usually permit a rough adjustment of the voltage by means of a simple gaseous regulator or "glow" current directed through a charge-spraying point or charge-spraying comb.

The above described drawbacks of the conventional Holtz-type static machines are overcome, and the above stated objects and advantages are attained by my present invention which provides for an improved arrangement of a static machine wherein I make use of a novel charging system, whereby I am able to improve substantially the effect of a continuous voltage supply from an external source and even to dispense completely with the requirement of such an external source. In the electrostatic machine according to my invention, a surface of insulating material (dielectric), or a plurality of dielectric surfaces moved in the same direction are provided on a movable charge transporting member such as, for instance, a rotatable disc or drum adapted either for separate excitation or self excitation in combination with an initial separate excitation from an external voltage source.

According to a main feature of my invention, auxiliary charge draining electrodes are provided adjacent and preceding the main corona point electrodes in the direction of movement of the dielectric surfaces, i. e. the direction of rotation in the case of rotating dielectric discs. These auxiliary charge draining electrodes are destined to remove a small portion of the charge arriving in their vicinity during the charge transfer on the moving dielectric surface, which portion of the charge is conducted from the auxiliary electrodes to the adjacent exciting induction electrodes which are disposed on the reverse side of the moving surface or surfaces in a position opposite the main corona point electrodes and thus offer to the latter the necessary "influence" charge which enables these subsequently arranged corona point electrodes to remove the entire remaining charge, or, as the case may be, to spray on a new charge of opposite sign. Thereby a potential difference is set up between the main charge-spraying corona point electrode and the charge-removing electrode in the low voltage region and simultaneously between the former electrode and the "influence" electrode, and correspondingly in the high voltage region, which is identical to the exciting voltage.

The arrangement of auxiliary corona point electrodes offers the advantage that when using separate excitation from an external voltage source, no transverse discharges occur across the dielectric surface of, for instance, the rotating disc, since the auxiliary electrodes have an equalizing effect upon the charge present. When operating the static machine exclusively by self excitation, the use of auxiliary charge-removing electrodes is absolutely necessary, since otherwise the machine could not operate continuously.

Furthermore, according to another feature of my invention, my electrostatic machines are provided with an improved regulating device for adjusting the resulting high voltage to a desired working point. By means of this regulating device, I "influence" the exciting potential of an electrostatic machine in the low voltage region by a glow discharge current obtained from the high voltage region by way of a corona point-plate system in such a manner that a pulsing (or beat) excitation potential is set up without applying a fixed reference voltage. Thereby an increase in the high voltage causes a decrease in excitation voltage, which, in turn, reduces the charging current and consequently the high voltage, or vice versa.

A second point-plate system can be used for further improving the regulating effect, which system is connected on the one hand to the high voltage terminal and on the other hand is grounded by way of, preferably, a variable resistor, thereby consuming any excessive generator current.

Instead of providing one low voltage and one high voltage pole per charge-transporting dielectric surface, it is also possible to provide several pairs of such poles, with corresponding poles of each pair being connected in parallel.

It is also possible to arrange, in the machine of my invention, a plurality of discs or drums and to connect them in pairs, in series, or their corresponding sides in parallel.

One of the chief objects of my invention is to provide an electrostatic machine which is especially useful as a high-voltage source for electrostatic spraying of paint or aerosols or for the operation of electronic beam-tubes. These purposes can be fully accomplished as the machine according to my invention generates voltages up to 200 kv., with a rated voltage of 150 kv., respectively, with one rotating disc (of Mycalex or Araldit) of about 190 mm. diameter and at a pressure of 15–20 kg./cm.$^2$ of the gaseous medium (hydrogen) in the container. By connecting several discs or machines in series a total voltage of 1 million volts can be easily attained.

Other objects and advantages will become apparent as the description of my invention continues in connection with the accompanying drawings in which:

Fig. 1b shows another embodiment of an electrostatic machine similar to the one shown in Fig. 1a;

Fig. 2 shows a schematic arrangement of an electrostatic machine according to my invention comprising a load resistor and a regulating device for the resulting high voltage to a desired working point;

Fig. 3 illustrates in a partially sectional view an arrangement of an electrostatic machine according to the invention as used in practice.

Figure 1A:
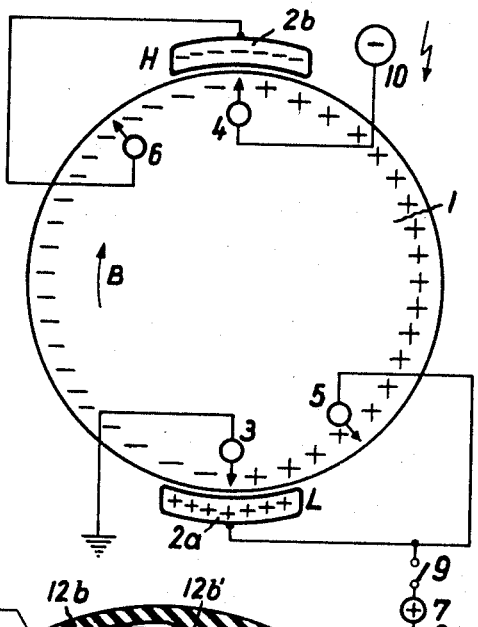
Fig. 1a represents schematically an electrostatic machine according to my invention having one drum made of dielectric.

Referring now to the drawings more in detail, particularly to Fig. 1a, the drum 1, which rotates in the direction of arrow B, possesses two main poles H and L. Each of these main poles, of which L is the low voltage pole and H the high voltage pole, is provided with three electrodes which are disposed substantially parallel to the moving drum surface. The exciting "influence" electrode 2a is disposed in the low voltage region and the corresponding "influence" electrode 2b in the high voltage region. The "influence" electrode 2a is opposed in the low voltage region by a main charge-spraying corona point electrode 3, and the "influence" electrode 2b is opposed in the high voltage region by a charge-removing corona point electrode 4. Preceding each main corona point electrode I provide, adjacent the same, an auxiliary corona point 5 and 6, respectively. These corona point electrodes may have the shape of blades, or "combs," provided with needles or teeth, or tensioned wires.

In order to start the machine, a separate excitation voltage is applied during at least a half revolution of the drum 1 by interposing an external voltage source 8 between the terminal 7 and ground. Contactor switch 9 is closed during this half revolution of drum 1. Thereby the main corona point electrode 3 is forced to spray a charge on to the moving dielectric surface of drum 1. This charge is transferred mechanically by the rotation of drum 1 to the high voltage pole H where a small part thereof is removed through the charge-removing auxiliary corona point electrode 6 by way of which this small charge portion is conducted to the exciting "influence" electrode 2b. Due to the potential building up between the latter electrode 2b and the main charge-removing corona point electrode 4, the entire charge arriving from the low voltage region is removed through the corona point electrode 4 and, conversely speaking, a charge of opposite sign is sprayed on to the rotating drum 1 through corona point electrode 4. The latter charge of opposite sign is transferred mechanically away from the high voltage pole on the opposite side of the drum until it reaches the vicinity of the auxiliary corona point electrode 5 which removes a small portion of charge of opposite sign sprayed on through electrode 4. Auxiliary electrode 5 raises this small initial portion of a new charge from the exciting "influence" electrode 2a. Thus, the steps of charging and discharging are repeated in a continuous cycle.

During the further continuous operation of the machine, contactor switch 9 is kept interrupted if the machine is to operate exclusively with self excitation. New charges are continuously sprayed on by electrode 3, and a working high voltage can be removed continuously through the terminal electrode 10. The drum 1 is rotated by, for instance, a suitable drive connected to a motor (not shown).

Figure 1B:
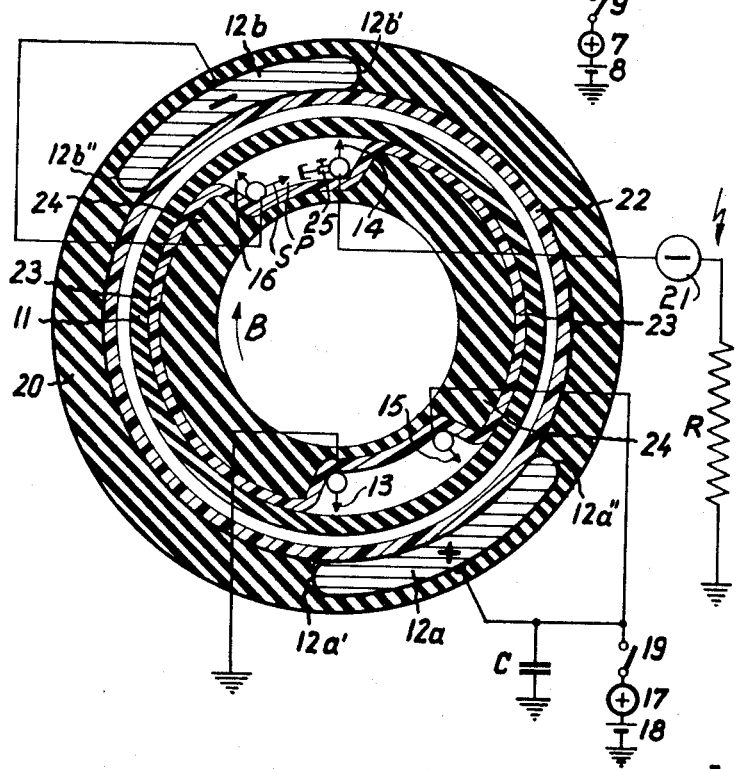

In the embodiment of an electrostatic machine shown in Fig. 1b, the main corona point electrodes 13 and 14 are arranged opposite the region of the tail edge 12a', 12b' of the exciting electrodes 12a and 12b, respectively, while the auxiliary corona point electrodes 15 and 16 are disposed opposite the "influence" electrodes 12a and 12b at a sufficient distance from the front edges 12a'', 12b'' of the latter so that their coronas do not extend beyond these front edges of the exciting electrodes. The drum 11 which is rotated in the direction of arrow B is surrounded by a stator 20 made of dielectric material. The two "influence" electrodes 12a and 12b are embedded, for instance, by casting, in the stator 20. The electrodes 12a and 12b are broadened and displaced in comparison with those shown in Fig. 1a so that, for instance, "influence" electrode 12a is disposed to cover the entire reach in which the main corona point 13 and the auxiliary corona point 15 are located, while the "influence" electrode 12b is so arranged that it covers the entire reach containing the main corona point 14 and the auxiliary corona point 16.

According to another embodiment of the electrostatic machine of my invention, which embodiment is not illustrated, the induction electrodes 12a and 12b can be arranged on the rotor 11, while the main electrodes 13 and 15 and the auxiliary electrodes 14 and 16 can be arranged on the stator 20. Due to the increased distance between the two main corona points 13 and 14 in this latter arrangement, it is possible to obtain an increase in the resulting voltage.

The embodiment shown in Fig. 1b further comprises an external voltage source 18 connected to the terminal 17 and a switch 19 for connecting or disconnecting the external source to the generator, either for a short period or, if the load warrants it, permanently to electrodes 12a and 15. The exciting voltage is stabilized, for instance by a capacitor C which is preferably permanently connected. A load resistor R is connected to the high voltage terminal 21. Furthermore, a layer 22 of low conductivity material such as hard paper or the like covers the inside of the hollow stator and consequently also the inner surfaces of electrodes 12a and 12b. This layer 22 serves for controlling the potential between the main poles. A similar layer 23 is also provided between the corona point electrodes in the low voltage region as well as in the high voltage region. The corona point electrodes are moreover protected against influences from external fields by shielding means 24, for instance, in the form of low conductivity insulators having a specific resistance of from $10^{10}$ to $10^{12}$ cm., or of a high dielectric which is covered with a low-conductivity layer. Stabilizing electrodes S and P are provided for stabilizing the voltage potential between the auxiliary charge-removing electrode 16 and the main charge-removing electrode 14. This arrangement offers the advantage of preventing the recharging voltage from exceeding a determined value. Adjusting means 25 are provided for adjusting the distance between electrodes S and P whereby the exciting potential to be set up in the low voltage region can be simultaneously controlled.

In a further embodiment shown in Fig. 2, I use an electrostatic machine connected to regulating elements D and E. This machine comprises the rotor 101, induction electrodes 102a and 102b, main corona points 103 and 104, and auxiliary corona points 105 and 106. A first regulating element D and a second regulating element E are connected to the high voltage region H of the generator. These regulating elements contain a point-plate arrangement. The plate 100d of element D is connected to the "influence" electrode 102a in the low voltage region, while the plate 100e is connected to ground via rheostat F which can be zero, if required. Dependent upon the distance of the points 107d and 107e from the plates 100d and 100e, respectively, which distance is regulated by suitable adjusting means 108d and 108e, respectively, the working high voltage to be applied to the load resistor R can be adjusted to a desired working point. The sequence in which points and plates are arranged in the regulating elements D and E depends on the desired polarity of the working voltage. The regulating and stabilizing effects are improved by providing a point electrode S between the auxiliary electrode 106 and the main electrode 104 in the high voltage region.

Finally, Fig. 3 illustrates an electrostatic machine according to the invention as used in practice. The container 109 is filled with a suitable gas such as hydrogen under pressure. In the container 109 there is arranged a motor, preferably a three-phase current motor 110, which is mounted with its shaft vertically disposed in the container. A carrier plate 111 is flangedly connected to the hull of motor 110 and bears the generator casing 112.

In this arrangement of the stator being a hollow casing enclosing the motor, and in which the casing is directly mounted on the motor 110, the symmetry of the electric generator field is not disturbed by any metallic supporting elements. The motor shaft 115 extends upwardly through a central opening in the carrier plate 111, two dielectric induction plates 113 and 114 being attached to a hub 115a which is provided with an inner insulating sleeve 115b and is thus mounted on the upper end of shaft 115. Combs 116 and 116a are mounted in the wall of the hollow generator casing 112 in a plane intermediate the two parallel dielectric induction plates 113 and 114 in the embodiment shown in Fig. 3. These plates are rotated in the same direction and connected in parallel. The combs 116 and 116a cooperate with the exciting "influence" electrodes 117 and 118 which are provided in the top and bottom plate 112a and 112b of the generator casing. By means of a cable 119a and a high voltage lead 119b, the generated high voltage is conducted to the terminal electrode 119 and from there via the line 120 to the consuming device. A high ohmic shunt resistance 121 is provided for measuring the high voltage. The current from shunt resistance 121 is directed by way of the cable 123 to measuring instrument 124 wherein the ampere meter A registers the current in milliamperes, while the volt-meter V registers the voltage in kilo-volts. A point-plate arrangement 122 similar to the regulating device designated by reference character E in Fig. 2 is mechanically arranged in parallel with the shunt resistance 121 and serves to regulate the load by altering the distance from the point 122a to the plate 122b through altering the position of the latter in the set collar 122c.

In order to measure the total current, the ampere meter A is interposed into the current circuit of the charge-removing comb 116a in the low voltage region. Both the line from the ampere meter A to the electrode 116a and the current supply line to the motor 110 are housed in the cable 125, current for the meter being fed from a suitable current source through plug 126a and cable 126. The instrument panel of measuring instrument 124 bears the service knobs 127 for switching motor 110 on and off, 128 for switching on and off the initial separate excitation, and 129 for adjusting the exciting voltage. Knob 130 serves for switching on and off capacitor C connected for the purpose explained hereinbefore in regard to Fig. 1b. The exciting voltage line is coupled to ground by means of a point-plate system 131 of variable distance.

In a further variation of the embodiment shown in Fig. 3, the motor can be provided with a second shaft end to which a dynamo can be initially or permanently coupled. The dynamo can be started by self excitation. Furthermore, the motor 110 can be arranged outside the pressure container 109.

It will be understood that this invention is susceptible to modification in order to adapt it to different usages and conditions, and, accordingly, it is desired to comprehend such modifications within this invention as may fall within the scope of the appended claims.

What is claimed is:

1. In an electrostatic charging system, having a low voltage region and a high voltage region, the combination with at least one rotatable charge-transporting member bearing at least one surface of insulating material, of influence electrode means on one side of said surface in the low voltage region and in the high voltage region, respectively, main corona point means and auxiliary corona point means being located opposite said influence electrode means on the other side of said surface, said auxiliary corona point means preceding said main corona point means in the direction of movement of said surface so as to remove a portion of the charge transported on said surface, said auxiliary means being connected to said influence electrode means to impress upon the latter said charge portion, a voltage potential being set up between said main corona point means and said auxiliary corona point means, and simultaneously between said main corona point means and said influence electrode means in the low voltage region and in the high voltage region, respectively, which potentials represent the exciting voltages.

2. An electrostatic machine adapted for at least initially separate excitation from an external voltage source, comprising at least one rotatable charge-transporting member bearing at least one surface of insulating material and having a low voltage region and a high voltage region; first and second induction electrode means in said low voltage region and high voltage region, respectively, said induction electrode means confronting one side of said surface; first and second main corona point electrode means confronting the other side of said surface in said low voltage region and said high voltage region, respectively, opposite said induction electrode means; at least one auxiliary corona point electrode means preceding at least said first and main corona point electrode means in the direction of movement of said member, said auxiliary electrode means confronting the same side of said surface as said main electrode means; and means for connecting said auxiliary corona point electrode means to said induction electrode means.

3. An electrostatic machine adapted for at least initially separate excitation from an external voltage source, comprising at least one rotatable charge-transporting means bearing at least one surface of insulating material and adapted to pass through a low voltage region and a high voltage region; first and second influence electrode means, each confronting the same side of said surface in the low voltage region and the high voltage region, respectively, said influence electrodes each having a front and a trailing edge in the direction of rotation of said charge-transporting means; first and second main corona point electrodes confronting the other side of said surface opposite the trailing edges of said influence electrodes in said low voltage and high voltage regions, respectively; and auxiliary corona point electrodes preceding said main corona point electrodes in the direction of rotation of said charge-transporting means on the same side of said surface as said main electrodes, opposite said influence electrode means away from the front edge of the latter, said auxiliary means being connected to the influence electrode in the same region, thereby removing a small portion of said charge on said surface in said region and impressing the same upon said influence electrode means.

4. An electrostatic machine as described in claim 3 wherein said charge-transporting member is disc shaped.

5. An electrostatic machine as described in claim 3 wherein said charge-transporting member is drum shaped.

6. An electrostatic machine adapted for at least initially separate excitation from an external voltage source, comprising at least one rotatable charge-transporting member bearing at least one surface of insulating material and having a low voltage main pole region and a high voltage main pole region; first and second induction electrode means in said low voltage main pole region and high voltage main pole region, respectively, said induction electrode means confronting one side of said surface; first and second main corona point electrode means confronting the other side of said surface in said low voltage main pole region and said high voltage main pole region, respectively, opposite said induction electrode means; auxiliary corona point electrode means preceding said main corona point electrode means in the direction of rotation of said member, said auxiliary electrode means confronting the same side of said surface as said main electrode means; means for connecting said auxiliary corona point electrode means to said induction electrode means; an insulating space, and shielding means for at least partially shielding said space; said main and auxiliary corona point electrodes pertaining to the same main pole region being housed in said space, said space shielding said electrodes against external field influences such as those of the other of said main pole regions.

7. An electrostatic machine as described in claim 6 wherein said insulating space consists of an insulating material having resistivity of $10^{10}$ to $10^{12}$ $\Omega$ cm.

8. An electrostatic machine as described in claim 6 wherein said insulating space consists of a high insulating material, and a low conductivity layer covering said high insulating material.

9. An electrostatic machine adapted for at least initially separate excitation from an external voltage source comprising at least one stator means, at least one rotatable charge-transporting member bearing at least one surface of insulating material and having a low voltage region and a high voltage region; first and second induction electrode means in said low voltage region and high voltage region, respectively, said induction electrode means confronting one side of said surface; first and second main corona point electrode means confronting the other side of said surface in said low voltage region and said high voltage region, respectively, opposite said induction electrode means; at least one auxiliary corona point electrode means preceding at least said first main corona point electrode means in the direction of rotation of said member, said auxiliary electrode means confronting the same side of said surface as said main electrode means; means for connecting said auxiliary corona point electrode means to said induction electrode means; and a thin low conductivity layer between said stator means and said rotatable member on at least one side of said surface of insulating material, said layer serving as potential control.

10. An electrostatic machine adapted for at least initially separate excitation from an external voltage source comprising at least one stator means, said stator means forming a closed casing, at least one rotatable charge-transporting member bearing at least one surface of insulating material and having a low voltage region and a high voltage region; first and second induction electrode means in said low voltage region and high voltage region, respectively, said induction electrode means confronting one side of said surface; first and second main corona point electrode means confronting the other side of said surface in said low voltage region and said high voltage region, respectively, opposite said induction electrode means; at least one auxiliary corona point electrode means preceding at least said first main corona point electrode means in the direction of rotation of said member, said auxiliary electrode means confronting the same side of said surface as said main electrode means; and means for connecting said auxiliary corona point electrode means to said induction electrode means.

11. In an electrostatic charging system, having a low voltage region and a high voltage region, the combination with at least one rotatable charge-transporting member bearing at least one surface of insulating material, of influence electrode means on one side of said surface, main corona point means opposite said influence electrode means on the other side of said surface, and auxiliary corona point means on the same side as said main corona point means and preceding the latter in the direction of movement of said surface so as to remove a portion of the charge transported on said surface, said auxiliary means being connected to said influence electrode means to impress upon the latter said charge portion, a voltage potential being set up in the low voltage region between said main corona point means and said auxiliary means, and simultaneously between said main corona point means and said influence electrode means, which potential represents the exciting voltage, and a point-plate system comprising a point element and a plate element, one of which elements is connected with said main corona point means in said high voltage region, the other element being connected to said influence electrode means in said low voltage region for producing a glow current between said elements, said glow current influencing said excitor voltage so that an increase in high voltage causes a decrease in excitor voltage and, in turn, a decrease in charging current and consequently in high voltage, as well as vice versa.

12. In an electrostatic charging system, having a low voltage region and a high voltage region, the combination with at least one rotatable charge-transporting member bearing at least one surface of insulating material, of influence electrode means on one side of said surface, main corona point means opposite said influence electrode means on the other side of said surface, and auxiliary corona point means on the same side as said main corona point means and preceding the latter in the direction of movement of said surface so as to remove a portion of the charge transported on said surface, said auxiliary means being connected to said influence electrode means to impress upon the latter said charge portion, a voltage potential being set up in the low voltage region between said main corona point means and said auxiliary means, and simultaneously between said main corona point means and said influence electrode means, which potential represents the exciting voltage, a first point plate system comprising a point element and a plate element, one of which elements is connected with said main corona point means in said high voltage region, the other element being connected to said influence electrode means in said low voltage region for producing a glow current between said elements, said glow current influencing said exciter voltage so that an increase in high voltage causes a decrease in exciter voltage and, in turn, a decrease in charging current and consequently in high voltage, as well as vice versa, and a second point-plate system whose point is connected to said main corona point means in said high voltage region, and whose plate is connected to ground via a variable resistor, said second point-plate system consuming excessive generator current.

13. An electrostatic machine adapted for at least initially separate excitation from an external voltage source, comprising at least one rotatable charge-transporting member bearing at least one surface of insulating material and having a low voltage region and a high voltage region; first and second induction electrode means in said low voltage region and high voltage region, respectively, said induction electrode means confronting one side of said surface; first and second main corona point electrode means confronting the other side of said surface in said low voltage region and said high voltage region, respectively, opposite said induction electrode means; auxiliary corona point electrode means preceding said main corona point electrode means in the direction of movement of said member, said auxiliary electrode means confronting the same side of said surface as said main electrode means; means for connecting said auxiliary corona point electrode means to said induction electrode means; and stabilizing and regulating means between said main and said auxiliary corona point electrode means, thereby preventing the charge transfer through said auxiliary corona point means from exceeding a determined value.

14. An electrostatic machine adapted for at least initially separate excitation from an external voltage source comprising at least one stator means, at least one rotatable charge-transporting member bearing at least one surface of insulating material and having a low voltage region and a high voltage region; first and second induction electrode means in said low voltage region and high voltage region, respectively, said induction electrode means confronting one side of said surface; first and second main corona point electrode means confronting the other side of said surface in said low voltage region and said high voltage region, respectively, opposite said induction electrode means; auxiliary corona point electrode means preceding said main corona point electrode means in the direction of movement of said member, said auxiliary electrode means confronting the same side of said surface as said main electrode means; means for connecting said auxiliary corona point electrode means to said induction electrode means; motor means comprising a motor shaft and a housing for said motor means, said stator means being flangedly connected to said housing so as to eliminate disturbances of the symmetry of the electric field of the machine owing to the absence of metallic support means, said movable charge-transporting member being mounted on said motor shaft at one end thereof.

15. An electrostatic machine as described in claim 14, further comprising a dynamo being adapted for starting by self excitation, said dynamo being at least initially coupled to the end of said motor shaft opposite said charge-transporting member.

16. An electrostatic machine as described in claim 14, further comprising a container filled with a gas under pressure, said motor being housed inside said container.

17. An electrostatic machine as described in claim 14 wherein said motor means consists of a three-phase motor so as to avoid sliding parts.

References Cited in the file of this patent

UNITED STATES PATENTS

| | | |
|---|---|---|
| 776,997 | Burboa | Dec. 6, 1904 |
| 1,071,196 | Wommelsdorf | Aug. 26, 1913 |
| 1,947,220 | Nickle | Feb. 13, 1934 |
| 2,545,354 | Hansen | Mar. 13, 1951 |
| 2,675,516 | Felici | Apr. 13, 1954 |
| 2,754,433 | Point | July 10, 1956 |